United States Patent
Pendergrass

(10) Patent No.: US 10,487,799 B2
(45) Date of Patent: Nov. 26, 2019

(54) PRESSURE AND VACUUM ASSISTED VERTICAL AXIS WIND TURBINES

(71) Applicant: Dan Pendergrass, Tucson, AZ (US)

(72) Inventor: Dan Pendergrass, Tucson, AZ (US)

( * ) Notice: Subject to any disclaimer, the term of this patent is extended or adjusted under 35 U.S.C. 154(b) by 122 days.

(21) Appl. No.: 15/375,971

(22) Filed: Dec. 12, 2016

(65) Prior Publication Data

US 2017/0175706 A1    Jun. 22, 2017

Related U.S. Application Data

(60) Provisional application No. 62/269,275, filed on Dec. 18, 2015.

(51) Int. Cl.
| | |
|---|---|
| *F03D 3/04* | (2006.01) |
| *F03D 3/00* | (2006.01) |
| *F03D 3/06* | (2006.01) |
| *F03D 7/06* | (2006.01) |
| *F03D 9/00* | (2016.01) |
| *H02K 7/18* | (2006.01) |

(52) U.S. Cl.
CPC .......... *F03D 3/0445* (2013.01); *F03D 3/005* (2013.01); *F03D 7/06* (2013.01); *H02K 7/183* (2013.01); *F05B 2240/213* (2013.01); *F05B 2270/32* (2013.01); *Y02E 10/74* (2013.01)

(58) Field of Classification Search
CPC ...... F03D 3/00445; F03D 3/005; F03D 3/061; F03D 7/06; F03D 9/002; H02K 7/183; F05B 2240/213
See application file for complete search history.

(56) References Cited

U.S. PATENT DOCUMENTS

| | | | | | |
|---|---|---|---|---|---|
| 932,253 | A | * | 8/1909 | Daub | F04D 25/166 415/60 |
| 2,812,823 | A | * | 11/1957 | De Oviedo | F03D 3/0409 415/129 |
| 4,076,448 | A | * | 2/1978 | Sanders, Jr. | F03B 3/00 415/184 |
| 4,084,918 | A | * | 4/1978 | Pavlecka | F03D 3/0454 415/1 |
| 4,191,505 | A | * | 3/1980 | Kaufman | F03D 3/0463 415/2.1 |
| 4,234,289 | A | * | 11/1980 | Lebost | F03D 3/0481 415/4.4 |

(Continued)

*Primary Examiner* — Tulsidas C Patel
*Assistant Examiner* — Joseph Ortega
(74) *Attorney, Agent, or Firm* — Loza & Loza LLP; Kevin L. Soules

(57) ABSTRACT

A system and apparatus for wind energy conversion comprising a Savonius style rotor attached to a drive shaft; a first airfoil configured to block air pressure along a return side of the rotor; an airfoil cowling configured to direct blocked air on the return side of the rotor to intersect with air on the drive side of the rotor; at least one vacuum compensator configured on a top edge of the first airfoil wherein the at least one vacuum compensator redirects the blocked air on the return side of the rotor onto the driven side of the rotor; an anemometer; a wind direction indicator; and a computer system operatively connected to the roller and track assembly wherein the computer system adjusts the orientation of the rotor according to a wind speed measured by the anemometer and a wind direction measured by the wind direction indicator.

19 Claims, 6 Drawing Sheets

(56) References Cited

U.S. PATENT DOCUMENTS

| | | | | |
|---|---|---|---|---|
| 4,428,711 A * | | 1/1984 | Archer | F03D 1/04 415/2.1 |
| 4,600,360 A * | | 7/1986 | Quarterman | F03D 1/04 415/148 |
| 4,606,697 A * | | 8/1986 | Appel | F03D 3/02 415/4.4 |
| 4,915,580 A * | | 4/1990 | Obidniak | F03D 1/00 415/2.1 |
| 5,083,899 A * | | 1/1992 | Koch | F03D 3/0481 415/2.1 |
| 5,332,354 A * | | 7/1994 | Lamont | F03D 3/0463 415/4.2 |
| 5,375,968 A * | | 12/1994 | Kollitz | F03D 3/0409 415/2.1 |
| 5,391,926 A * | | 2/1995 | Staley | F03D 3/0409 290/55 |
| 5,895,011 A * | | 4/1999 | Gubin | B64C 29/00 244/12.1 |
| 5,969,430 A * | | 10/1999 | Forrey | F03D 3/0463 290/54 |
| 6,382,904 B1 * | | 5/2002 | Orlov | F03D 1/04 415/4.5 |
| 6,437,457 B2 * | | 8/2002 | Roskey | F03D 1/0608 290/55 |
| 6,638,005 B2 * | | 10/2003 | Holter | F03D 3/005 415/4.2 |
| 6,981,839 B2 * | | 1/2006 | Fan | F03D 3/002 415/4.1 |
| 6,984,899 B1 * | | 1/2006 | Rice | F03D 3/049 290/44 |
| 7,008,171 B1 * | | 3/2006 | Whitworth | F03D 3/061 415/4.2 |
| 7,600,963 B2 * | | 10/2009 | Miller | F03B 17/061 415/4.3 |
| 7,960,852 B2 * | | 6/2011 | Cumings | F03D 3/02 290/55 |
| 8,052,372 B1 * | | 11/2011 | Dvorak | F03D 3/0454 415/2.1 |
| 8,128,337 B2 * | | 3/2012 | Pezaris | F03D 3/02 415/4.2 |
| 8,202,051 B2 * | | 6/2012 | Ackerman | F03D 1/025 416/13 |
| 8,210,792 B2 * | | 7/2012 | Suma | F03D 3/0427 415/4.2 |
| 8,232,664 B2 * | | 7/2012 | Stroup | F03D 3/0418 290/55 |
| 8,562,298 B2 * | | 10/2013 | Vallejo | F03D 3/061 415/71 |
| 8,591,170 B1 * | | 11/2013 | Rawls | F03D 3/002 415/4.2 |
| 8,593,009 B1 * | | 11/2013 | Vaczi | F03D 3/02 290/55 |
| 8,786,123 B2 * | | 7/2014 | Bannister | F03D 3/002 290/55 |
| 8,823,201 B1 * | | 9/2014 | Al-Wasis | F03D 3/002 290/55 |
| 8,961,103 B1 * | | 2/2015 | Wolff | F03D 3/0409 415/4.2 |
| 9,013,054 B1 * | | 4/2015 | Charnesky | F03D 1/0608 290/55 |
| 9,041,238 B2 * | | 5/2015 | McMahon | F03D 3/002 290/55 |
| 9,103,317 B2 * | | 8/2015 | Garcia | F03D 3/002 |
| 9,206,785 B2 * | | 12/2015 | Poole | F03D 7/06 |
| 9,222,461 B2 * | | 12/2015 | Aranovich | F03D 3/04 |
| 9,273,665 B1 * | | 3/2016 | Krippene | F03D 3/0481 |
| 9,291,148 B2 * | | 3/2016 | Allaei | F03D 1/06 |
| 9,291,150 B2 * | | 3/2016 | Bassett | F03D 3/005 |
| 9,294,013 B2 * | | 3/2016 | Allaei | F03D 1/04 |
| 9,303,622 B2 * | | 4/2016 | Attey | F03D 3/002 |
| 9,371,818 B1 * | | 6/2016 | Monto | F03D 3/0427 |
| 9,453,494 B2 * | | 9/2016 | Krippene | F03D 9/39 |
| 9,644,611 B2 * | | 5/2017 | Jones | F03D 3/005 |
| 9,777,698 B2 * | | 10/2017 | Schlak | F03B 13/00 |
| 10,018,176 B2 * | | 7/2018 | Kiselovs | F03D 3/04 |
| 2004/0052635 A1 * | | 3/2004 | Wobben | F03D 3/005 415/4.1 |
| 2004/0108679 A1 * | | 6/2004 | Hayes | B60K 16/00 280/213 |
| 2004/0219019 A1 * | | 11/2004 | Taylor | F03D 3/0409 416/132 B |
| 2004/0265116 A1 * | | 12/2004 | Kaneda | F03D 3/0409 415/4.2 |
| 2005/0019151 A1 * | | 1/2005 | Bezemer | F03D 3/04 415/4.4 |
| 2007/0267874 A1 * | | 11/2007 | Taylor | H01M 8/0656 290/55 |
| 2007/0269304 A1 * | | 11/2007 | Burg | F03B 17/063 415/4.2 |
| 2007/0269305 A1 * | | 11/2007 | Burg | F03B 17/063 415/4.2 |
| 2007/0269306 A1 * | | 11/2007 | Burg | F03B 17/063 415/4.5 |
| 2009/0003999 A1 * | | 1/2009 | Whitworth | F03D 3/02 415/208.1 |
| 2009/0146432 A1 * | | 6/2009 | Ballena | F03D 3/0445 290/55 |
| 2009/0191057 A1 * | | 7/2009 | Knutson | F03D 3/0481 416/23 |
| 2009/0220339 A1 * | | 9/2009 | Wu | F03D 3/0445 416/1 |
| 2010/0213722 A1 * | | 8/2010 | Scott | F03D 3/0409 290/55 |
| 2010/0284802 A1 * | | 11/2010 | Presz, Jr. | F03D 1/04 415/182.1 |
| 2010/0303614 A1 * | | 12/2010 | Hector | F03B 17/062 415/151 |
| 2011/0070068 A1 * | | 3/2011 | Cumings | F03D 3/0481 415/30 |
| 2012/0139259 A1 * | | 6/2012 | Glezer | F03G 6/04 290/55 |
| 2012/0141252 A1 * | | 6/2012 | Dvorak | F03D 3/0454 415/1 |
| 2013/0149131 A1 * | | 6/2013 | O'Keefe | F03D 3/0409 415/208.1 |
| 2013/0195636 A1 * | | 8/2013 | Poole | F03D 7/06 415/203 |
| 2013/0280058 A1 * | | 10/2013 | Biagini | F03D 1/02 415/207 |
| 2014/0241873 A1 * | | 8/2014 | Degala | F03D 1/04 415/208.5 |
| 2015/0047352 A1 * | | 2/2015 | Glezer | F02C 1/05 60/641.8 |
| 2015/0226173 A1 | | 8/2015 | Galetskij | |
| 2016/0377053 A1 * | | 12/2016 | Reyna | F03D 3/005 415/210.1 |
| 2017/0138344 A1 * | | 5/2017 | Guignard | F03B 17/065 |
| 2017/0306925 A1 * | | 10/2017 | Rubio | F03D 3/02 |

* cited by examiner

US 10,487,799 B2

PRESSURE AND VACUUM ASSISTED VERTICAL AXIS WIND TURBINES

CROSS REFERENCE TO RELATED PATENT APPLICATIONS

This patent application claims the priority and benefit under 35 U.S.C. § 119(e) of U.S. Provisional Patent Application Ser. No. 62/269,275 filed Dec. 18, 2015, entitled "PRESSURE AND VACUUM ASSISTED VERTICAL AXIS WIND TURBINES." U.S. Provisional Patent Application Ser. No. 62/269,275 is herein incorporated by reference in its entirety.

TECHNICAL FIELD

Embodiments are generally related to the field of renewable energy sources. In particular, the embodiments are related to power generation via wind, water, or other fluid dynamics. The embodiments are further related to pressure and vacuum assisted vertical axis wind turbines with a closed Savonius style rotor for converting wind energy into electricity.

BACKGROUND

Converting energy in wind into rotational energy has long been desirable. Historically, windmills, in the form of gristmills, were used to mill grain and wind pumps were used to pump water. Modern windmills often take the form of wind turbines. Horizontal axis wind turbines generally use mechanical or electrical devices to convert the rotational energy of vanes or blades into electricity.

While modern horizontal axis windmills are useful, they also suffer from a number of problems. Many horizontal wind turbines have massive blades set on very tall towers. The blades of these turbines reach speeds in excess of 150 miles an hour. Such windmills are unsightly and expensive. Furthermore, the high-speed blades are a hazard for wildlife and other airborne objects.

Alternative approaches to harness wind energy include vertical axis wind generators. However, prior art vertical axis systems are often either unreliable or inefficient. Accordingly, a need exists for improved methods and systems for harnessing wind energy and converting it into electricity.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide methods, systems, and apparatuses for converting wind energy into rotational energy.

It is another aspect of the disclosed embodiments to convert wind energy into electricity.

It is another aspect of the disclosed embodiments to provide Savonius style wind generators.

It is yet another aspect of the disclosed embodiments to provide a pressure and vacuum assisted method and system for vertical axis wind turbines with a closed Savonius style rotor for converting wind energy into electricity.

The aforementioned aspects and other objectives and advantages can now be achieved as described herein. A method and system for wind energy conversion comprises a Savonius style rotor attached to a drive shaft, a first airfoil configured to block air pressure along a return side of the rotor, an airfoil cowling configured to direct blocked air on the return side of the rotor to intersect with air on the drive side of the rotor, at least one vacuum compensator configured on a top edge of the first airfoil wherein the at least one vacuum compensator redirects the blocked air on the return side of the rotor onto the driven side of the rotor, an anemometer, a wind direction indicator, and a computer system operatively connected to the roller and track assembly wherein the computer system adjusts the orientation of the rotor according to a wind speed measured by the anemometer and a wind direction measured by the wind direction indicator.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
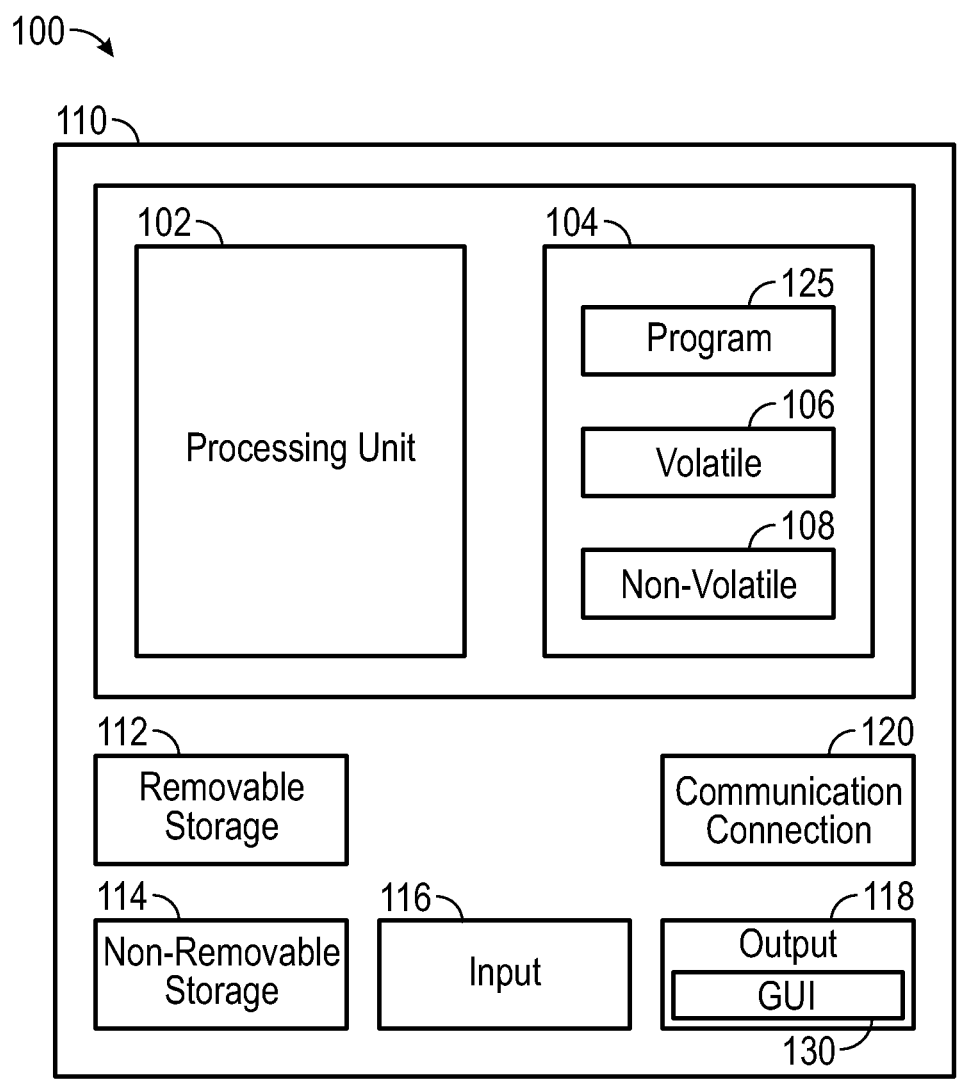
FIG. 1 depicts a block diagram of a computer system which is implemented in accordance with the disclosed embodiments.
Figure 2:
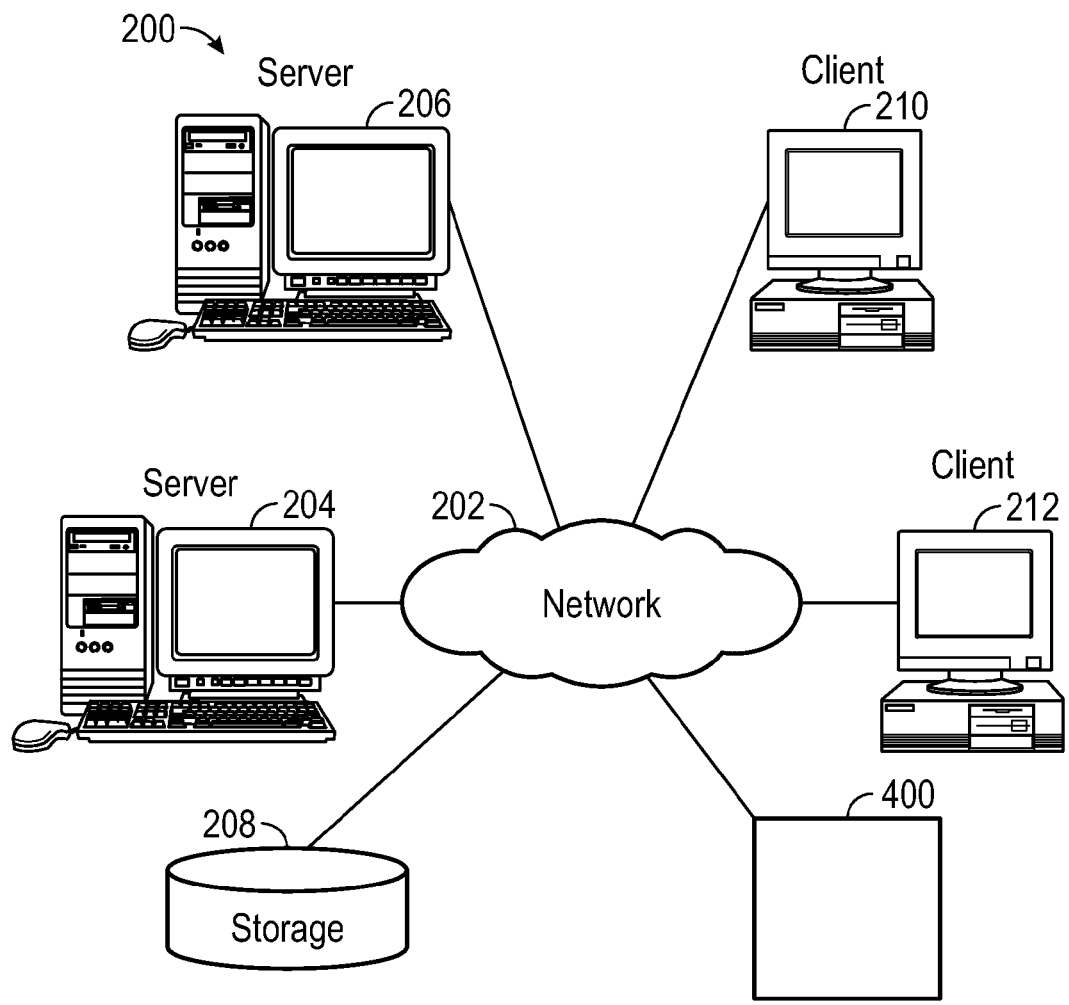
FIG. 2 depicts a graphical representation of a network of data-processing devices in accordance with the disclosed embodiments.
Figure 3:
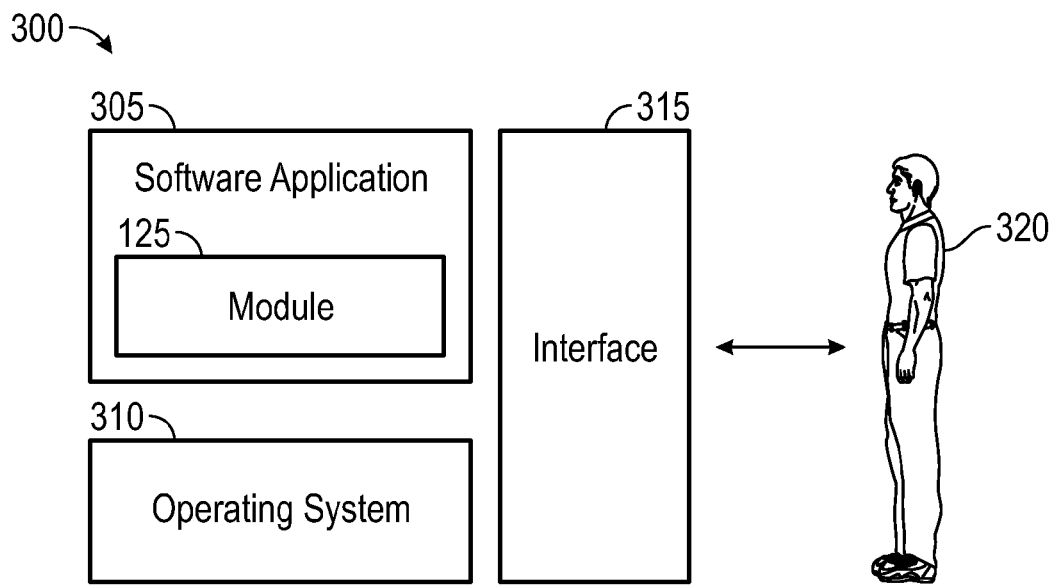
FIG. 3 depicts a computer software system for directing the operation of the data-processing system depicted in FIG. 1, in accordance with the disclosed embodiments.

FIGS. 1-3 are provided as exemplary diagrams of data-processing environments in which aspects of the embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, mechanical devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, printers, copiers, faxes, multi-function devices (MFDs), mobile devices, mobile phones, Smartphones, external mechanical devices, wind sensors, anemometers, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing system 200 in which aspects of the present invention may be implemented. Network data-processing system 200 is a network of computers or other such devices such as printers, scanners, fax machines, MFD's, rendering devices, mobile phones, smartphones, tablet devices, mechanical devices, sensors, and the like in which embodiments of the present invention may be implemented. Note that the system 200 can be implemented in the context of a software module such as program module 125. The system 200 includes a network 202 in communication with one or more clients 210, 212, and/or 400. Network 202 may also be in communication with one or more servers 204 and 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 204 and 206, one or more external devices such as rendering devices, mobile devices, actuators, mechanical devices, wind turbine devices 400, and/or a memory storage unit such as, for example, memory or database 208.

In the depicted example, servers 204 and 206, and clients 210, 212, and 400 connect to network 202 along with storage unit 208. Clients 210, 212, and 400 may be, for example, personal computers or network computers, handheld devices, mobile devices, tablet devices, smartphones, personal digital assistants, printing devices, MFDs, wind sensors, anemometers, mechanical devices, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 400. Clients 210, 212, and 400 can be clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from non-removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices, multi-processor systems, data networks, microprocessor-based or programmable consumer electronics, networked personal computers, minicomputers, mainframe computers, servers, and the like.

Note that the term module or node as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface) can serve to display results, whereupon a user 320 may supply additional inputs or terminate a particular session. In some embodiments, operating system 310 and GUI 315 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to certain aspects of embodiments of the present invention, which can be embodied in the context of or require the use of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

The methods and systems disclosed herein use an airfoil that takes advantage of Bernoulli's principle and Kutta Joukowski flow effects to create a push and pull Savonius style wind generator.

Figure 4:
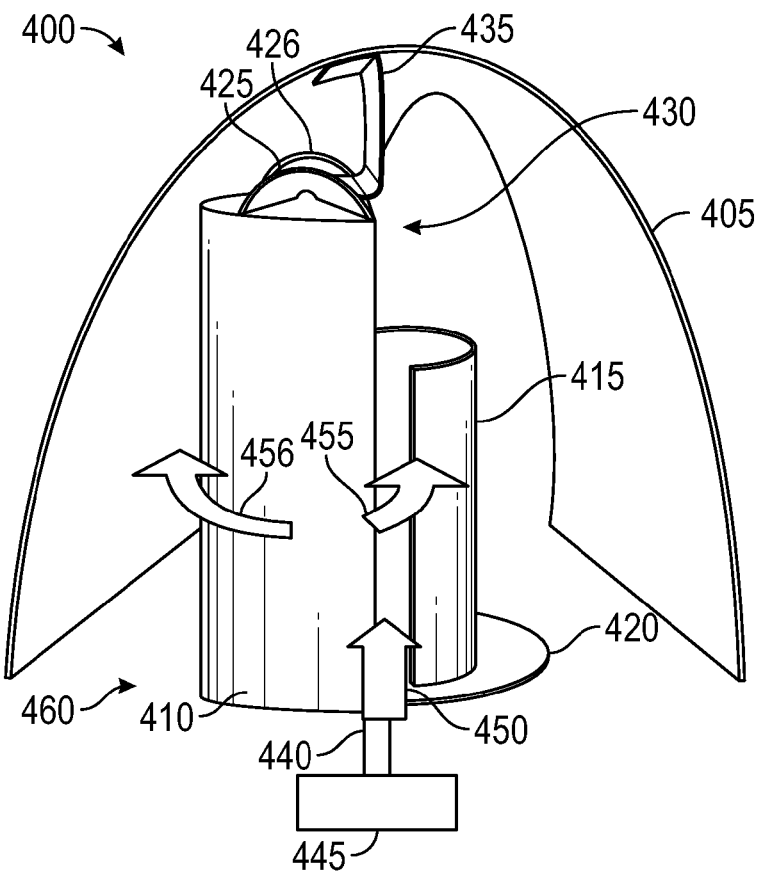
FIG. 4 depicts a vertical axis wind turbine with a closed Savonius style rotor system in accordance with the disclosed embodiments.

FIG. 4 illustrates an embodiment of a system 400 for converting wind energy into another form of energy, most commonly electricity. The system 400 generally includes a rotor or turbine 415 mounted to a mounting plate 420. When air pressure from airflow 450 enters the system, airflow 455 on the drive side of the rotor 415 is caught by the rotor 415. This causes the rotor 415 and mounting plate 420 to rotate. The rotor 415 and/or mounting plate 420 are connected to a drive shaft 440. As the rotor 415 and mounting plate 420 rotate, the drive shaft is also rotated. The drive shaft 440 is operably connected to a generator 445 configured to convert the rotational energy from the drive shaft into electricity. In other embodiments, the generator 445 can be configured to act as a pump to draw liquid or can be configured to convert the rotational energy of drive shaft 440 into other forms of energy. This constitutes the so-called "push" force on the rotor 415.

The system 400 includes an airfoil 410 with a curve that blocks air pressure associated with an airflow 450 against the return side of the rotor or turbine 415. It should be appreciated that in one embodiment, the airfoil 410 is shaped as a Fibonacci curve. However, other shapes of airfoil 410 may be equivalently used depending on design considerations. For example, airfoil 410 may be semi-circular, rounded, semi-elliptical, etc.

The airfoil 410 blocks the air pressure from airflow 450 against the return side of the rotor 415. Given the vertical axis of the system 400, preventing air pressure from airflow 450 on the return side of the rotor provides a significant increase in efficiency by drastically reducing resistance and/or pressure on the return side of the rotor 415. Thus, the airflow 455 drives the drive side of the rotor 415, while blocked air 456 does not act against the return side of the rotor 415.

Figure 6:
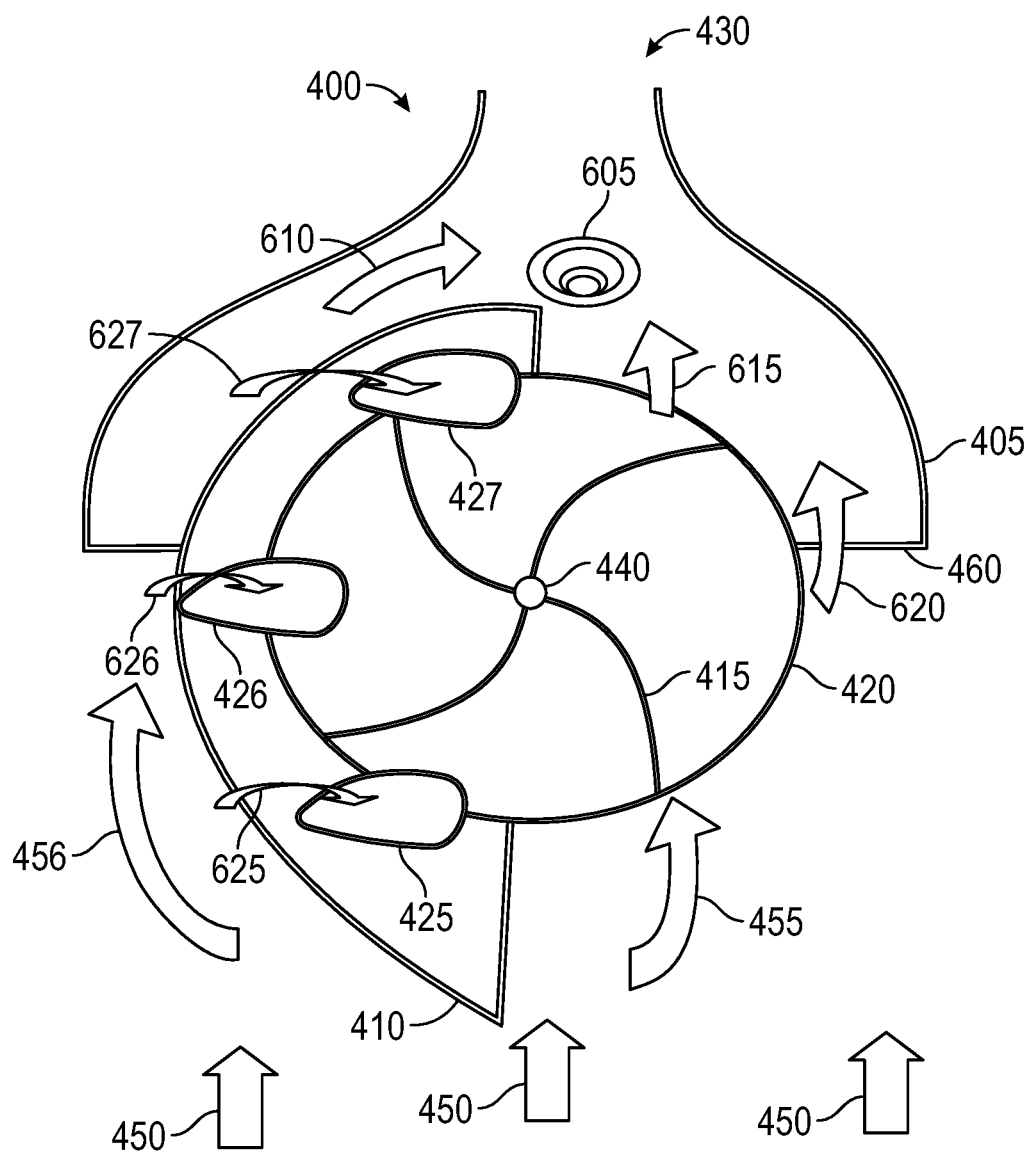
FIG. 6 depicts a block diagram of an energy conversion system in accordance with the disclosed embodiments.

The system 400 also includes an airfoil cowling 405. Airfoil cowling 405 can be dome shaped with openings on the front 460 and back 430. A connecting bracket 435 can connect the airfoil cowling 405 to the airfoil 410. The shape of the airfoil cowling 405 can be chosen to maximize the capture of air 450 incident to the front opening 460 such that the maximum airflow 455 is incident on the drive side of the rotor 415. The airfoil cowling 405 catches the blocked air 456 on the return side of the rotor 415 creating a high-speed airflow 456 between the airfoil 410 and the airfoil cowling 405. The airfoil cowling 405 causes air from both the driven and blocked sides of the rotor to intersect on the backside of the rotor 415 before exiting the back 430 of airfoil cowling 405 creating a vacuum. This intersection is illustrated in FIG. 6. The vacuum created on the back of rotor 415 creates the so-called "pull" force on the rotor 415.

Additional driving force is provided on the rotor 415 from vacuum compensators 425 and 426 formed along the top surface of airfoil 410. The vacuum compensators 425 and 426 redirect airflow 456 moving between the airfoil 410 and airfoil cowling 405 on to the driven portion of the rotor 415.

Figure 5:
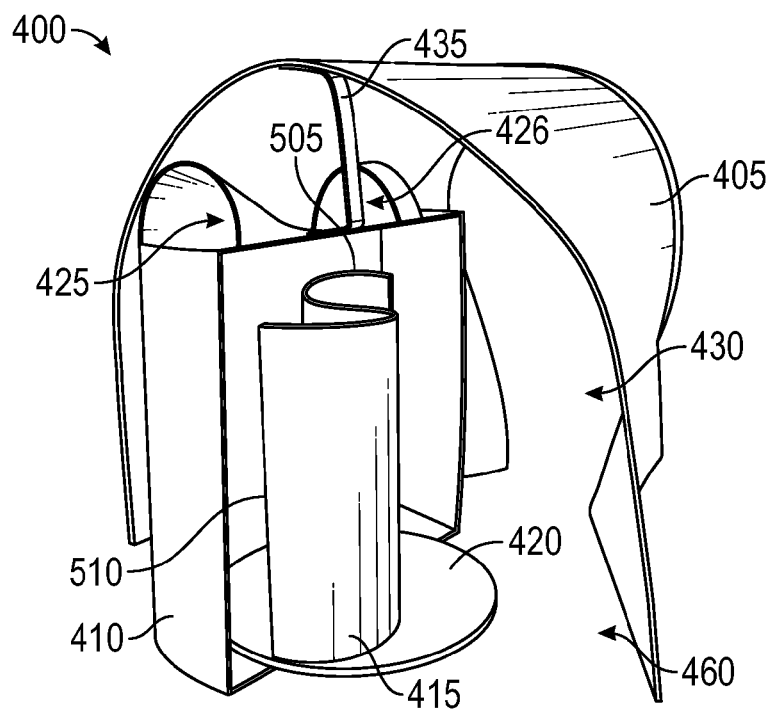
FIG. 5 depicts a vertical axis wind turbine with a closed Savonius style rotor system in accordance with the disclosed embodiments.

FIG. 5 illustrates the system 400 at a different angle. This angle illustrates that the airfoil cowling 405 can be formed to collect air on both the drive side and blocked side of the rotor 415. Additionally, the back 430 of airfoil cowling 405 can be formed to be narrower at the bottom and wider at the top. Other shapes of back opening 430 may alternatively be selected to augment the pull force experienced by the rotor 415.

FIG. 5 also illustrates that rotor 415 can include at least one, and potentially as many as 6 or more, vanes. In FIG. 5 two vanes 505 and 510 are illustrated. Vanes 505 and 510 rise vertically from mounting plate 420 and are connected along their respective vertical axes at the center point of mounting plate 420. In a preferred embodiment, each of the one or more vanes may be configured as a single piece or may be connected along their vertical axes at the center point of mounting plate 420.

Of particular importance is the shape of the vanes such as vanes 505 and 510. For reference, in FIG. 5, vane 510 is oriented on the drive side of rotor 415 and vane 505 is oriented on the return side of rotor 415. Vanes 505 and 510 are formed to be concave while they are oriented on the drive side of rotor 415 such that the leading edge on the drive side comprises an air scoop configured to efficiently catch wind incident thereon. The vanes 505 and 510 are also formed to be convex or otherwise aerodynamically efficient when oriented on the return side of rotor 415 such that the return edge comprises an aerodynamic profile configured to reduce wind resistance. In this way, the rotor 415 maximizes the wind's pushing force on the vanes 505 and 510 while they are oriented on the drive side and minimizes wind resistance on the vanes 505 and 510 while they are oriented on the return side.

FIG. 6 illustrates a block diagram of a top view of the system 400 and the various wind paths associated with incident wind 450 as it passes through system 400. Incident wind 450 is initially distributed across the face of airfoil cowling 405. Incident wind on the drive side of the system 455 engages the vane scoops of rotor 415. The air pressure from wind 455 drives the rotation of rotor 415 and the rotation of drive shaft 440.

Airfoil 410 blocks incident wind 450 on the blocked side. Blocked wind 456 travels along the airfoil 410 and between airfoil 410 and airfoil cowling 405. Some of the blocked wind 456 is caught by the vacuum compensators. Vacuum compensator 425 is shown catching a portion of blocked wind 456 shown as caught wind 625. Similarly, vacuum compensator 426 catches caught wind 626, and vacuum compensator 427 catches caught wind 627. The vacuum compensators 425, 426, and 427 redirect caught wind 625, 626, and 627 back on to the scooped side of the vanes of rotor 415 providing additional lift and driving force on the rotor in the direction of rotation.

As a fluid or gas increases in velocity, in order to conserve mechanical energy, the static pressure of the fluid or gas must decrease. Thus, when a gas, such as incoming wind 450 passes through a constriction, such as wind 610 moving through the space between airfoil 410 and airfoil cowling 415, the increased velocity results in a drop in pressure. This is known as the Venturi effect. The Venturi effect accounts for a low pressure created on the downwind side of rotor 415 which acts as a "pulling" force on the rotor, thereby imparting increased rotational velocity. This is at the heart of the increased efficiency provided by the present systems and methods.

Additionally, Bernoulli and Kutta Joukowski effects created by the shapes of airfoil 410 and airfoil cowling 405 and the intersection of airflow 610 with airflow exiting the rotor 615 and air passing through the drive side 620 result in the development of a vortex 605 on the leeward side of the rotor 415. The resulting negative air pressure further "pulls" the rotors creating additional rotational velocity and improving the system's total efficiency.

Figure 7:
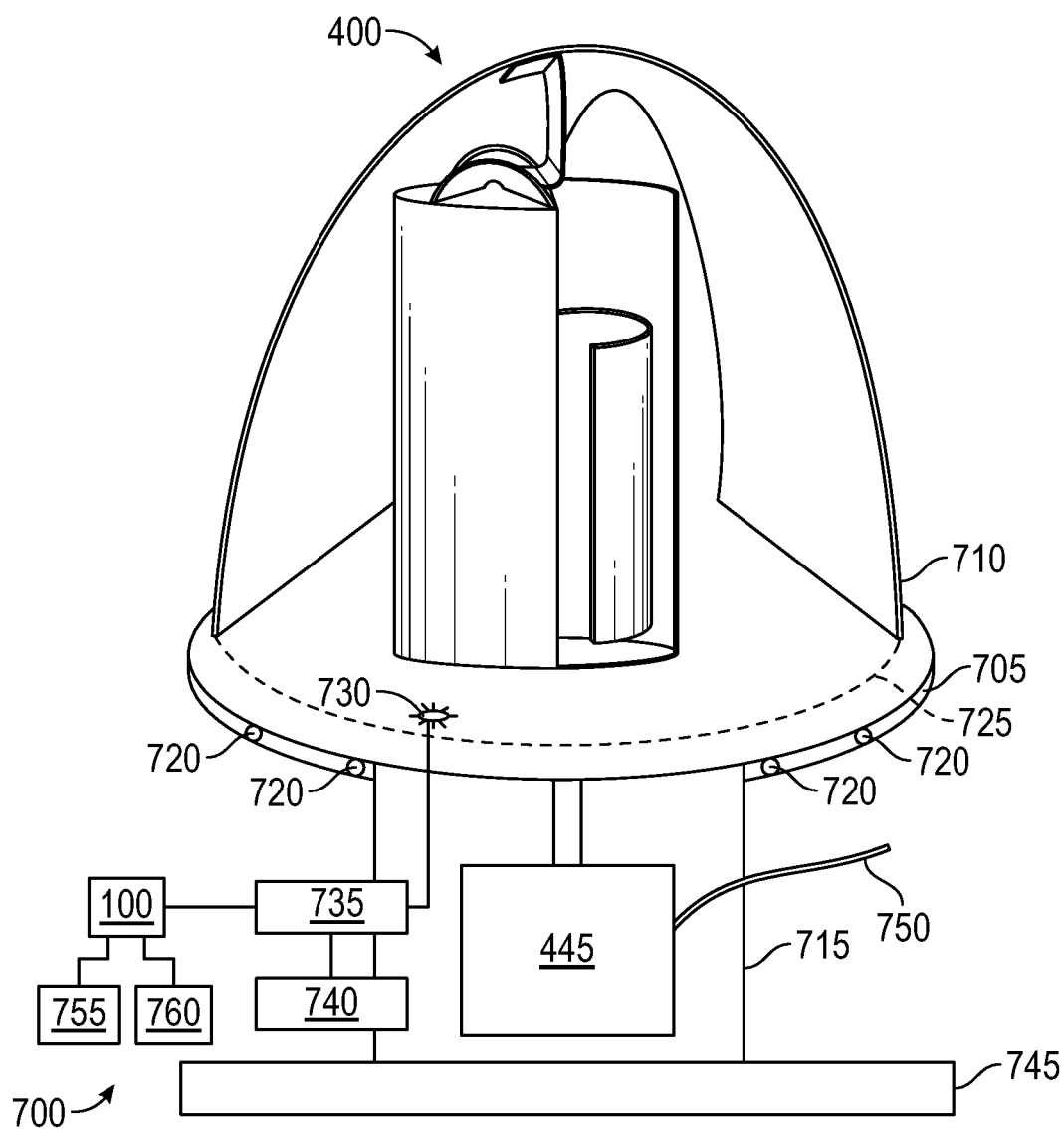
FIG. 7 depicts a block diagram of a track and mounting system in accordance with the disclosed embodiments.

FIG. 7 illustrates a front view of the system 400 mounted on rotating base assembly 700. System 400 can be mounted to rotating base ring 710. Roller axles 720 formed between base ring 710 and base plate 705 facilitate the rotation of base ring 710. Roller axles 720 can further comprise one or more ball bearings.

The inner rim of base ring 710 can have gear track 725. Gear track 725 comprises a plurality of gear teeth formed to interface with gear teeth on driving gear 730. The driving gear 730 is driven with step motor 735. This arrangement allows the base ring 710 and system 400 to rotate 360 degrees. In another embodiment, a bearing assembly can replace or augment the roller axels 720 and travel within the base ring 710. The bearings can be exposed via a channel in the base ring to base plate 705. The generator 445 is shown with external control assemblies 740 and the step motor 735, all formed in the stand 715 affixed to base 745. Electricity produced by generator 445 can be transmitted to the power grid or to a storage mechanism (e.g., a battery) along transmission line 750.

The rotating base assembly 700 allows for the optimal selection of an angle of the system 400 with respect to incident wind. The assembly 700 can be used to adjust the orientation of the system 400. In an exemplary embodiment, the system includes control mechanisms associated with the rotating base assembly. Wind direction and speed can be monitored using an anemometer 755, wind direction indicator 760, and/or other known wind measuring instruments. The base ring 715 can be rotated using stepping motor 735 to control the driven side of the rotor. The orientation of the system 700 is optimized according to the air speed and direction. The goal is to optimize airflow to the driven side angle. In severe winds, the angle controls can be augmented by a standard generator shaft friction mechanism and a locking system to prevent excessive strain on friction brakes and stepping motor 735.

Figure 8:
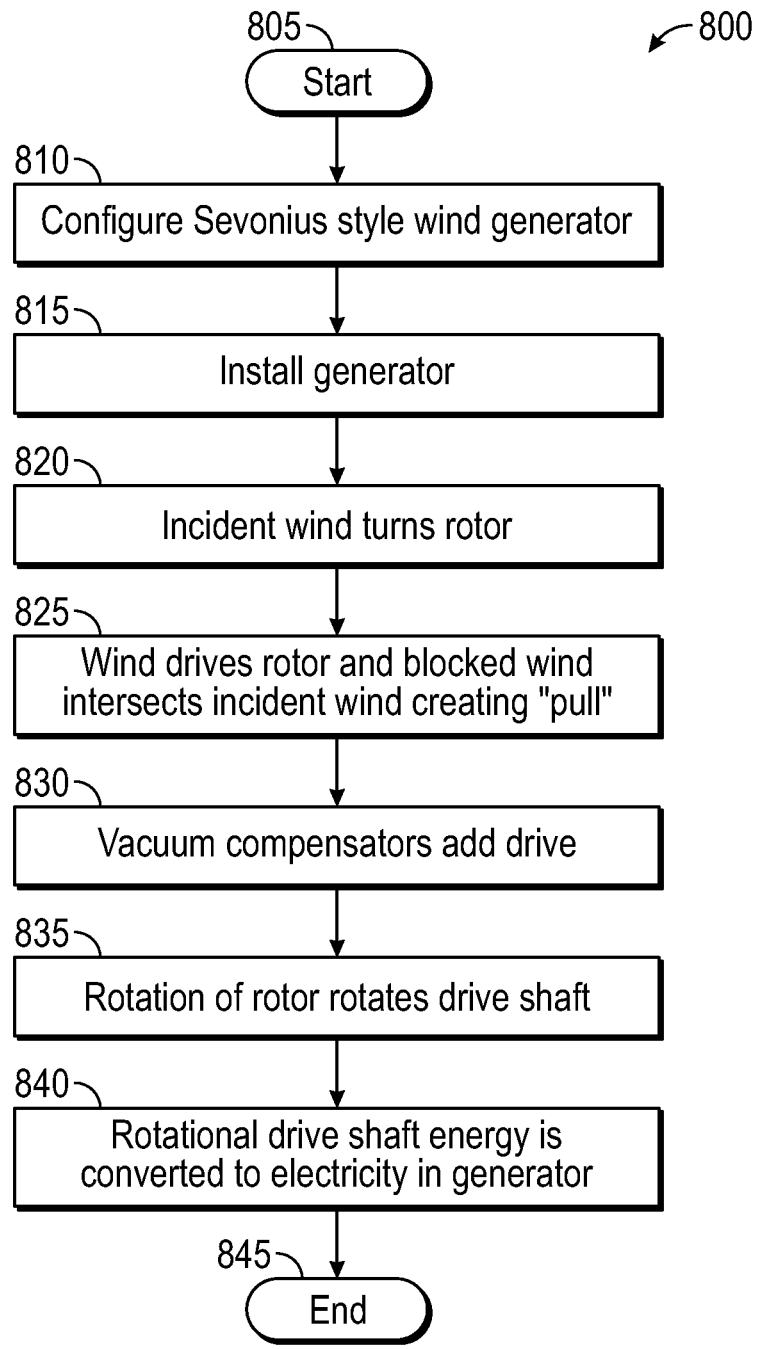
FIG. 8 depicts a flow chart of logical operational sub steps associated with converting wind energy into electricity in accordance with the disclosed embodiments.

Software associated with computer system 100 can be used to control the various mechanisms, including system orientation based on rotor speed, wind direction determined by an on-board wind vane 760, wind speed by on-board anemometer 755, and according to rotor vibration. In other embodiments, an on-board wind vane can be used to adjust the orientation of the system via the forces exerted by the wind flowing past the system FIG. 8 illustrates a method 800 for converting wind or fluid energy into electricity in accordance with an embodiment of the invention. The method begins at block 805. Initially, a pressure and vacuum assisted system for vertical axis wind turbines on a closed Savonius style rotor system for converting wind energy into electricity such as system 100 can be configured at block 810.

With the system prepared, a generator can be connected to the system as shown at block 815. In one embodiment, the generator can be configured to convert rotational energy into electricity. However, the generator may alternatively be configured for other useful purposes such as pumping liquids, etc. Wind incident on the system rotates the rotors of the system as shown at block 820. The orientation of the system to the wind can be adjusted using an automatic vane. Alternatively, the orientation of the system can be adjusted using an anemometer, wind direction indicator, and a computer system operatively connected to the roller and track assembly wherein the computer system adjusts the orientation of the rotor according to a wind speed measured by the anemometer and a wind direction measured by the wind direction indicator.

As illustrated at block 825, the incident wind on the drive side of the rotor drives or "pushes" the rotation of the rotor while the wind blocked by the airfoil intersects the incident wind on the leeward side of the system, "pulling" the rotor. At block 830, vacuum compensator adds drive to the rotor.

Rotation of the rotor, according to the various forces in blocks 825 and 830, rotates a drive shaft operably connected to the rotor as illustrated at block 835. At block 840, the rotational energy of the drive shaft is then converted into electricity (or other such usable form of energy) by the generator, installed at block 815. At this stage, the converted energy may be stored or applied to an application requiring energy. The method ends at block 845.

This process when compared to a non-modified Savonius systems has shown an increase of up to 450% in operational efficiency. The systems and methods disclosed herein thus provide a number of advantages over prior art horizontal and vertical turbines.

First, the methods and systems stabilize the airflow on the rotor thereby minimizing turbulence damage to the turbines. This allows the methods and systems disclosed herein to maintain a small vertical stature and horizontal footprint. The embodiments low profile can be used in residential applications on rooftops or even on adjacent land space.

Additionally, the closed nature of the system does not entice airborne wildlife to fly into the blades because the system appears to be mostly solid instead of open. The use of the airfoil to block airflow as an initial control mechanism minimizes friction braking fires that have cost the lives of maintenance personnel in prior art systems. In addition, the low profile and relative location to the ground mitigate safety risks common to tower based prior art.

Furthermore, high-speed airflow will not hamper the efficiency of the rotor when return drag would otherwise begin to cancel the drive side pressure. Indeed as air speed increases, the vacuum pressure increases and the rotor "takes off" at a relatively low air speed.

Finally, the system can be decorated to suit individual tastes and is therefore more aesthetically pleasing than prior art systems.

Based on the foregoing, it can be appreciated that a number of embodiments preferred and alternative, are disclosed herein. For example, in one embodiment, a system for energy conversion comprises a rotor attached to a drive shaft, a first airfoil configured to block air pressure along a return side of the rotor, and an airfoil cowling configured to direct blocked air on the return side of the rotor to intersect with air on a drive side of the rotor.

In an embodiment, the system further comprises at least one vacuum compensator configured on a top edge of the first airfoil wherein the at least one vacuum compensator redirects the blocked air on the return side of the rotor onto the driven side of the rotor.

In another embodiment, the system further comprises a generator operatively connected to the drive shaft wherein the generator is configured to transform mechanical rotation of the drive shaft into electricity.

In an embodiment, the rotor comprises a Savonius style rotor. In another embodiment, the Savonius style rotor comprises a leading edge comprising a scoop and a return edge comprising an aerodynamic profile configured to reduce wind resistance. In an embodiment, the first airfoil is formed in an arc defined by at least one of Fibonacci like curve and an aerodynamic shape that focuses negative air pressure toward a leeward side of an airflow.

In another embodiment, the system further comprises a roller and track assembly comprising a roller mounted to a circular track in order to allow adjustment of an orientation of the first airfoil and the airfoil cowling.

In an embodiment, the system can further comprise an anemometer, a wind direction indicator, and a computer system operatively connected to the roller and track assembly wherein the computer system adjusts the orientation of the rotor according to a wind speed measured by the anemometer and a wind direction measured by the wind direction indicator.

In yet another embodiment, an apparatus for converting wind energy to electricity comprises a rotor attached to a drive shaft, a first airfoil configured to block air pressure along a return side of the rotor, and an airfoil cowling configured to direct blocked air on the return side of the rotor to intersect with air on a drive side of the rotor.

In an embodiment, the apparatus further comprises at least one vacuum compensator configured on a top edge of the first airfoil wherein the at least one vacuum compensator redirects the blocked air on the return side of the rotor onto the driven side of the rotor.

In another embodiment, the apparatus further comprises a generator operatively connected to the drive shaft wherein the generator is configured to transform mechanical rotation of the drive shaft into electricity.

In an embodiment, the rotor comprises a Savonius style rotor. In an embodiment, the Savonius style rotor comprises a leading edge comprising a scoop and a return edge comprising an aerodynamic profile configured to reduce wind resistance. In yet another embodiment, the first airfoil is formed in an arc defined by at least one of a Fibonacci like curve and an aerodynamic shape that focuses negative air pressure toward a leeward side of an airflow.

In another embodiment, the apparatus comprises a roller and track assembly comprising a roller mounted to a circular track in order to allow adjustment of an orientation of the first airfoil and the airfoil cowling.

An embodiment of the apparatus further comprises an anemometer, a wind direction indicator, and a computer system operatively connected to the roller and track assembly wherein the computer system adjusts the orientation of the rotor according to a wind speed measured by the anemometer and a wind direction measured by the wind direction indicator.

In another embodiment, a system for energy conversion comprises a Savonius style rotor attached to a drive shaft, a first airfoil configured to block air pressure along a return side of the rotor, an airfoil cowling configured to direct blocked air on the return side of the rotor to intersect with air on a drive side of the rotor, at least one vacuum compensator configured on a top edge of the first airfoil wherein the at least one vacuum compensator redirects the blocked air on the return side of the rotor onto the driven side of the rotor, an anemometer, a wind direction indicator, and a computer system operatively connected to the roller and track assembly wherein the computer system adjusts the orientation of the rotor according to a wind speed measured by the anemometer and a wind direction measured by the wind direction indicator.

In an embodiment, the system further comprises a generator operatively connected to the drive shaft wherein the generator is configured to transform mechanical rotation of the drive shaft into electricity.

In an embodiment, the Savonius style rotor comprises a leading edge comprising a scoop and a return edge comprising an aerodynamic profile configured to reduce wind resistance.

In an embodiment, the system further comprises a roller and track assembly comprising a roller mounted to a circular track in order to allow adjustment of an orientation of the first airfoil and the airfoil cowling.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for energy conversion comprising:
   a rotor attached to a drive shaft;
   a first airfoil configured to block air pressure on a return side of the rotor;
   an airfoil cowling comprising:
      a front opening, the front opening extending laterally beyond and above the first airfoil and extending laterally beyond and above the rotor, the airfoil cowling being configured to capture air on a drive side of the rotor, and to direct air, blocked by the first airfoil, between the airfoil cowling and the first airfoil; and
      a back opening, wherein the directed air flowing between the first airfoil and the airfoil cowling intersects air exiting the drive side of the rotor; and
   at least one vacuum compensator configure on a top surface of the first airfoil below the airfoil cowling, wherein the at least one vacuum compensator redirects the air blocked by the first airfoil onto the return side of the rotor.

2. The system of claim 1 further comprising:
   a connecting bracket connecting the top surface of the first airfoil to the air foil cowling.

3. The system of claim 1 further comprising:
   a generator operatively connected to the drive shaft wherein the generator is configured to transform mechanical rotation of the drive shaft into electricity.

4. The system of claim 1 wherein the back opening of the airfoil cowling is narrower at its bottom than at its top.

5. The system of claim 1 wherein the rotor comprises:
   at least two matching vanes connected along their respective vertical axes at the drive shaft.

6. The system of claim 1 wherein the first airfoil is formed in an arc defined by at least one of:
   Fibonacci like curve; and
   an aerodynamic shape that focuses negative air pressure toward a leeward side of an airflow.

7. The system of claim 1 further comprising:
   a roller and track assembly comprising a roller mounted to a circular track in order to allow adjustment of an orientation of the first airfoil and the airfoil cowling.

8. The system of claim 7 further comprising:
   an anemometer;
   a wind direction indicator; and
   a computer system operatively connected to the roller and track assembly wherein the computer system adjusts the orientation of the first airfoil and the airfoil cowling according to a wind speed measured by the anemometer and a wind direction measured by the wind direction indicator.

9. An apparatus for converting wind energy to electricity comprising:
   a rotor attached to a drive shaft;
   a first airfoil configured to block air pressure on a return side of the rotor;
   an airfoil cowling comprising:
      a front opening, the front opening extending laterally beyond and above the first airfoil and extending laterally beyond and above the rotor, the airfoil cowling being configured to capture air on a drive side of the rotor, and to direct air, blocked by the first airfoil, between the airfoil cowling and the first airfoil; and
      a back opening, wherein the directed air flowing between the first airfoil and the airfoil cowling intersects air exiting the drive side of the rotor; and
   at least one vacuum compensator configure on a top surface of the first airfoil below the airfoil cowling, wherein the at least one vacuum compensator redirects the air blocked by the first airfoil onto the return side of the rotor.

10. The apparatus of claim 9 further comprising:
    a generator operatively connected to the drive shaft wherein the generator is configured to transform mechanical rotation of the drive shaft into electricity.

11. The apparatus of claim 9 wherein the back opening of the airfoil cowling is narrower at its bottom than at its top.

12. The apparatus of claim 11 wherein the rotor comprises:
    at least two matching vanes connected along their respective vertical axes at the drive shaft.

13. The apparatus of claim 9 wherein the first airfoil is formed in an arc defined by at least one of:
    Fibonacci like curve; and
    an aerodynamic shape that focuses negative air pressure toward a leeward side of an airflow.

14. The apparatus of claim 9 further comprising:
a roller and track assembly comprising a roller mounted to a circular track in order to allow adjustment of an orientation of the first airfoil and the airfoil cowling.

15. The apparatus of claim 14 further comprising:
an anemometer;
a wind direction indicator; and
a computer system operatively connected to the roller and track assembly wherein the computer system adjusts the orientation of the first airfoil and the airfoil cowling according to a wind speed measured by the anemometer and a wind direction measured by the wind direction indicator.

16. A system for energy conversion comprising:
a rotor attached to a drive shaft;
a first airfoil configured to block air pressure on a return side of the rotor;
an airfoil cowling comprising;
a front opening, the front opening extending laterally beyond and above the first airfoil and extending laterally beyond and above the rotor, the airfoil cowling being configured to capture air on a drive side of the rotor, and to direct air, blocked by the first airfoil, between the airfoil cowling and the first airfoil; and
a back opening, wherein the directed air flowing between the first airfoil and the airfoil cowling intersects air exiting the drive side of the rotor;
at least one vacuum compensator configured on a top surface of the first airfoil, below the airfoil cowling, wherein the at least one vacuum compensator redirects the air blocked blocked by the first airfoil onto the return side of the rotor;
an anemometer;
a wind direction indicator; and
a computer system operatively connected to the roller and track assembly wherein the computer system adjusts the orientation of the first airfoil and the airfoil cowling according to a wind speed measured by the anemometer and a wind direction measured by the wind direction indicator.

17. The system of claim 16 further comprising:
a generator operatively connected to the drive shaft wherein the generator is configured to transform mechanical rotation of the drive shaft into electricity.

18. The system of claim 17 wherein the rotor comprises:
at least two matching vanes connected along their respective vertical axes at the drive shaft.

19. The system of claim 18 further comprising:
a roller and track assembly comprising a roller mounted to a circular track in order to allow adjustment of an orientation of the first airfoil and the airfoil cowling.

* * * * *